US011831523B2

(12) United States Patent
Coates et al.

(10) Patent No.: US 11,831,523 B2
(45) Date of Patent: *Nov. 28, 2023

(54) SYSTEMS AND METHODS FOR DISPLAYING ADJUSTABLE METRICS ON REAL-TIME DATA IN A COMPUTING ENVIRONMENT

(71) Applicant: SPLUNK INC., San Francisco, CA (US)

(72) Inventors: John Coates, Berkeley, CA (US); Lucas Murphey, Wadsworth, IL (US); James Hansen, San Ramon, CA (US); David Hazekamp, Tinley Park, IL (US)

(73) Assignee: SPLUNK INC., San Francisco, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/741,450

(22) Filed: Jan. 13, 2020

(65) Prior Publication Data

US 2020/0153714 A1 May 14, 2020

Related U.S. Application Data

(63) Continuation of application No. 15/582,092, filed on Apr. 28, 2017, now abandoned, and a continuation of
(Continued)

(51) Int. Cl.
H04L 43/045 (2022.01)
H04L 41/22 (2022.01)
(Continued)

(52) U.S. Cl.
CPC ........ H04L 43/045 (2013.01); G06F 16/1734 (2019.01); G06F 16/31 (2019.01);
(Continued)

(58) Field of Classification Search
CPC ....... H04L 41/22; H04L 43/045; G06F 16/31; G06F 16/33; G06F 16/383
See application file for complete search history.

(56) References Cited

U.S. PATENT DOCUMENTS 7,430,598 B2    9/2008  Raden et al.
7,480,647 B1*   1/2009  Murstein ................. H04L 43/08
(Continued)

OTHER PUBLICATIONS

Bartosz et al., Real-time Grid Monitoring Based on Complex Event Processing, 2011, https://reader.elsevier.com/reader/sd/pii/S0167739X11000562?token=388D90166B93C5E9F774D6646237EC03B1AAB4662D7830275A113EE6120D5C6851E841FBCDBCBA00FD6A86F3C979391B&originRegion=us-east-1&originCreation=20220630162529 (Year: 2011).*

(Continued)

Primary Examiner — Matthew J Ellis
(74) Attorney, Agent, or Firm — Perkins Coie LLP

(57) ABSTRACT

A system and computer-implemented is provided for displaying a configurable metric relating to an environment in a graphical display along with a value of the metric calculated over a configurable time period. The metric is used to identify events of interest in the environment based on processing real time machine data from one or more sources. The configurable metric is selected and a corresponding value is calculated based on the events of interest over the configurable time period. The value of the metric may be continuously updated in real time based on receiving additional real-time machine data and displayed in a graphical interface as time progresses. Statistical trends in the value of the metric may also be determined over the configurable time period and displayed in the graphical interface as well as an indication if the value of the metric exceeds a configurable threshold value. Further, a selection of one or more
(Continued)

thresholds for the value of the metric may be applied and an indication displayed indicating if the threshold(s) have been exceeded.

26 Claims, 11 Drawing Sheets

Related U.S. Application Data application No. 13/956,338, filed on Jul. 31, 2013, now Pat. No. 10,574,548.

(51) Int. Cl.
    *G06F 16/31*     (2019.01)
    *G06F 16/33*     (2019.01)
    *G06F 16/17*     (2019.01)
    *G06F 16/383*     (2019.01)

(52) U.S. Cl.
    CPC ............ *G06F 16/33* (2019.01); *G06F 16/383* (2019.01); *H04L 41/22* (2013.01); *G06F 2201/86* (2013.01)

(56) References Cited

U.S. PATENT DOCUMENTS

| | | | |
|---|---|---|---|
| 7,490,145 B2 * | 2/2009 | Sylor | ............... H04L 43/00 709/224 |
| 7,937,344 B2 | 5/2011 | Murphy et al. | |
| 8,112,425 B2 | 2/2012 | Baum et al. | |
| 8,364,648 B1 | 1/2013 | Sim-Tang et al. | |
| 8,412,696 B2 | 4/2013 | Zhang et al. | |
| 8,504,481 B2 | 8/2013 | Motahari et al. | |
| 8,707,194 B1 * | 4/2014 | Jenkins | ............... H04L 43/045 715/772 |
| 8,782,162 B1 * | 7/2014 | Deshpande | ............... G06F 16/95 709/224 |
| 9,516,046 B2 * | 12/2016 | Merza | ............... G06F 21/552 |
| 10,574,548 B2 | 2/2020 | Coates et al. | |
| 2004/0236757 A1 | 11/2004 | Caccavale et al. | |
| 2005/0015624 A1 * | 1/2005 | Ginter | ............... H04L 63/20 726/4 |
| 2006/0041535 A1 * | 2/2006 | Qamhiyah | ............... G06F 30/00 |
| 2006/0080595 A1 | 4/2006 | Chavoustie et al. | |
| 2006/0167704 A1 | 7/2006 | Nicholls et al. | |
| 2007/0033129 A1 | 2/2007 | Coates et al. | |
| 2007/0198565 A1 | 8/2007 | Ivanov et al. | |
| 2008/0086345 A1 * | 4/2008 | Wilson | ............... G06F 16/958 705/7.11 |
| 2008/0086363 A1 * | 4/2008 | Kass | ............... G06Q 10/04 705/7.29 |
| 2008/0195560 A1 | 8/2008 | Sutherland et al. | |
| 2009/0265263 A1 * | 10/2009 | Williams | ............... G06Q 40/06 705/37 |
| 2010/0005346 A1 | 1/2010 | Hamlescher et al. | |
| 2010/0024042 A1 | 1/2010 | Motahari et al. | |
| 2010/0275128 A1 | 10/2010 | Ward et al. | |
| 2011/0145134 A1 | 6/2011 | Bandman et al. | |
| 2011/0246826 A1 | 10/2011 | Hsieh et al. | |
| 2012/0017195 A1 | 1/2012 | Kaulgud et al. | |
| 2012/0059759 A1 | 3/2012 | Bagarella et al. | |
| 2012/0137367 A1 | 5/2012 | Dupont et al. | |
| 2012/0246303 A1 * | 9/2012 | Petersen | ............. G06F 16/1734 709/224 |
| 2013/0047039 A1 * | 2/2013 | Manes | ................ G06F 11/3466 714/47.1 |
| 2013/0097134 A1 | 4/2013 | Thompson et al. | |
| 2014/0108437 A1 | 4/2014 | Brown et al. | |
| 2015/0039749 A1 * | 2/2015 | Kwan | .................. H04L 43/067 709/224 |
| 2016/0103838 A1 * | 4/2016 | Sainani | ............... H04L 41/5045 707/725 |
| 2017/0070408 A1 | 3/2017 | Liao et al. | |
| 2017/0257292 A1 | 9/2017 | Coates et al. | |

OTHER PUBLICATIONS

Final Office Action dated May 14, 2019 for U.S. Appl. No. 15/582,092 by Coates, J., et al. filed Apr. 28, 2017.
Final Office Action dated Aug. 14, 2019 for U.S. Appl. No. 13/956,338 of Coates et al., filed Jul. 31, 2013.
Final Office Action dated Dec. 29, 2014 for U.S. Appl. No. 13/956,338 of Coates et al., filed Jul. 31, 2013.
Final Office Action dated Jan. 31, 2017 for U.S. Appl. No. 13/956,338 of Coates et al., filed Jul. 31, 2013.
Final Office Action dated Jan. 5, 2016 for U.S. Appl. No. 13/956,338 of Coates et al., filed Jul. 31, 2013.
Final Office Action dated May 7, 2014 for U.S. Appl. No. 13/956,338 of Coates et al., filed Jul. 31, 2013.
Non-Final Office Action dated Dec. 4, 2019 for U.S. Appl. No. 15/582,092 by Coates, J., et al. filed Apr. 28, 2017.
Non-Final Office Action dated Aug. 6, 2014 for U.S. Appl. No. 13/956,338 of Coates et al., filed Jul. 31, 2013.
Non-Final Office Action dated Jun. 24, 2016 for U.S. Appl. No. 13/956,338 of Coates et al., filed Jul. 31, 2013.
Non-Final Office Action dated Jun. 25, 2015 for U.S. Appl. No. 13/956,338 of Coates et al., filed Jul. 31, 2013.
Non-Final Office Action dated May 2, 2019 for U.S. Appl. No. 13/956,338 of Coates et al., filed Jul. 31, 2013.
Non-Final Office Action dated Oct. 21, 2013 for U.S. Appl. No. 13/956,338 of Coates et al., filed Jul. 31, 2013.
Non-Final Office Action dated Sep. 17, 2019 for U.S. Appl. No. 15/582,092 of Coates, J., et al. filed Apr. 28, 2017.
Non-Final Office Action dated Sep. 21, 2018 for U.S. Appl. No. 15/582,092 by Coates, J., et al. filed Apr. 28, 2017.
Notice of Allowance dated Oct. 9, 2019 for U.S. Appl. No. 13/956,338 of Coates et al., filed Jul. 31, 2013.
Bitincka, Ledion et al., "Optimizing Data Analysis With a Semi-Structured Time Series Database," Splunk Inc., 9 pages, 2010.
Final Office Action dated Apr. 20, 2018 for U.S. Appl. No. 13/956,338 by Coates, J., et al. filed Jul. 31, 2020.
Final Office Action dated Apr. 6, 2018, for U.S. Appl. No. 15/582,092 by Coates, J., et al. filed Apr. 28, 2017.
Non-Final Office Action dated Aug. 21, 2017 for U.S. Appl. No. 15/582,092 by Coates, J., et al. filed Apr. 28, 2017.
Non-Final Office Action dated Sep. 25, 2017 for U.S. Appl. No. 13/956,338 by Coates, J., et al. filed Jul. 31, 2013.
Carasso, David , "Exploring Splunk—Search Processing Lanaguage (SPL) Primer and Cookbook", Apr. 2012, 156 Pages.
Advisory Action for U.S. Appl. No. 15/582,092, dated Jan. 14, 2020, USPTO, 3 pages.

\* cited by examiner

Graphical Display 601

| Correlation search name | Security domain | Type | Next scheduled time | Status |
|---|---|---|---|---|
| ☐ Brute Force Access Behavior Detected | Access | Real time | N/A | Enabled \| Disable \| Change to scheduled |
| ☐ Cleartext Password At Rest Detected | Access | Real time | N/A | Disabled \| Enable \| Change to scheduled |
| ☐ Completely Inactive Account | Access | Scheduled | N/A | Disabled \| Enable |
| ☐ Default Account Activity Detected | Access | Real time | N/A | Disabled \| Enable \| Change to scheduled |
| ☐ Default Accounts At Rest Detected | Access | Real time | N/A | Disabled \| Enable \| Change to scheduled |
| ☐ Excessive Failed Logins | Access | Real time | N/A | Enabled \| Disable \| Change to scheduled |
| ☐ High or Critical Priority Individual Logging into Infected Machine | Access | Scheduled | 2013-07-18 09:15:00 PDT | Enabled \| Disable |
| ☐ Inactive Account Activity Detected | Access | Scheduled | 2013-07-18 09:54:00 PDT | Enabled \| Disable |
| ☐ Insecure Or Cleartext Authentication Detected | Access | Real time | N/A | Disabled \| Enable \| Change to scheduled |

SYSTEMS AND METHODS FOR DISPLAYING ADJUSTABLE METRICS ON REAL-TIME DATA IN A COMPUTING ENVIRONMENT

CROSS REFERENCE TO RELATED APPLICATIONS

This application is a continuation of U.S. patent application Ser. No. 15/582,092 filed on Apr. 28, 2017, titled "Systems and Methods for Displaying Metrics on Real-Time Data in an Environment", which is a continuation of U.S. patent application Ser. No. 13/956,338 filed on Jul. 31, 2013, titled "Key Indicators View", both of which are incorporated by reference herein in their entirety.

FIELD OF THE INVENTION

The embodiments described herein relate generally to data processing and management systems. More particularly, embodiments relate to calculating and displaying metrics on real-time data in an environment.

BACKGROUND OF THE INVENTION

Information systems generate vast amounts and wide varieties of machine data such as activity logs, configuration files, network messages, database records, etc. This machine data can be useful in troubleshooting systems, detecting operation trends, catching security problems, and measuring business performance. Unfortunately, however, a lack of tools to efficiently process and analyze heterogeneous datasets makes it tedious to mine the machine data for analytic insights. Most machine data such as generated logs, such as syslog and web-server logs, are unstructured text files. While the machine data may have some loosely implied structure, the specific structure varies across systems and environments, and is subject to frequent and unexpected changes. This type of data typically represents a complete history of events over time rather than a snapshot in time and is commonly several orders of magnitude larger than structured datasets.

Due to the large scale and temporal organization of log entries, traditional analysis techniques are often unsuitable for these datasets. Standard relational databases include a set of predefined fields in which machine data may be stored into for later analytics. The data is typically stored in static fields in rows and columns of the database. But once this data is summarized and stored in these predefined database fields, the underlying data is discarded and cannot be later analyzed or used as a basis for new search queries based on different fields or different combinations of fields. Thus despite being goldmines of information, these machine logs as well as other machine data are rarely explored and often deleted to free up storage space.

In addition, conventional approaches do not provide metrics that can be useful in analyzing and processing machine data. First, the relevance of certain events is unclear. For instance, the impact of events from a particular domain to the IT environment may be unclear. This makes it difficult to distinguish high-priority events from lower-priority events. Second, the meaning of machine data may be indirect and unclear. For instance, in the Enterprise Security context, it may be difficult to determine that a large number of access attempts is a problem event because it may be unclear what an access event consists of. Third, in many cases, system metrics are static and cannot be customized to address a particular problem. Finally, in many IT monitoring systems that process machine data, it is difficult to establish what the baseline of the system should be in order to further determine if there is a deviation from that baseline.

SUMMARY OF THE INVENTION

Systems and computer-implemented methods are provided for displaying a configurable metric relating to an environment in a graphical display along with a value of the metric calculated over a configurable time period. The metric is used to identify events of interest in the environment based on processing real time machine data from one or more sources. The configurable metric is selected and the corresponding value is calculated based on the events of interest during the configurable time period.

The value of the metric may be continuously updated in real time based on receiving additional real-time machine data and displayed in a graphical interface as time progresses. Trends in the value of the metric may also be determined over the configurable time period and displayed in the graphical interface as well as an indication indicating if a configurable threshold for the value has been exceeded. The metrics may be selected from a list of predetermined metrics or may be customizable. A drill down view of the machine data underlying the value of the selected metric may also be displayed upon selection of the metric summary in the graphical interface.

These and other details of embodiments along with their many of their advantages and features are described in the following description, claims, and figures.

BRIEF DESCRIPTION OF THE DRAWINGS

A better understanding of at least certain embodiments of the invention can be obtained from the following detailed description in conjunction with the following drawings, in which:

FIG. 6A depicts an example listing of correlation searches in a graphical display according to one embodiment;

DETAILED DESCRIPTION OF SPECIFIC EMBODIMENTS

Figure 1:
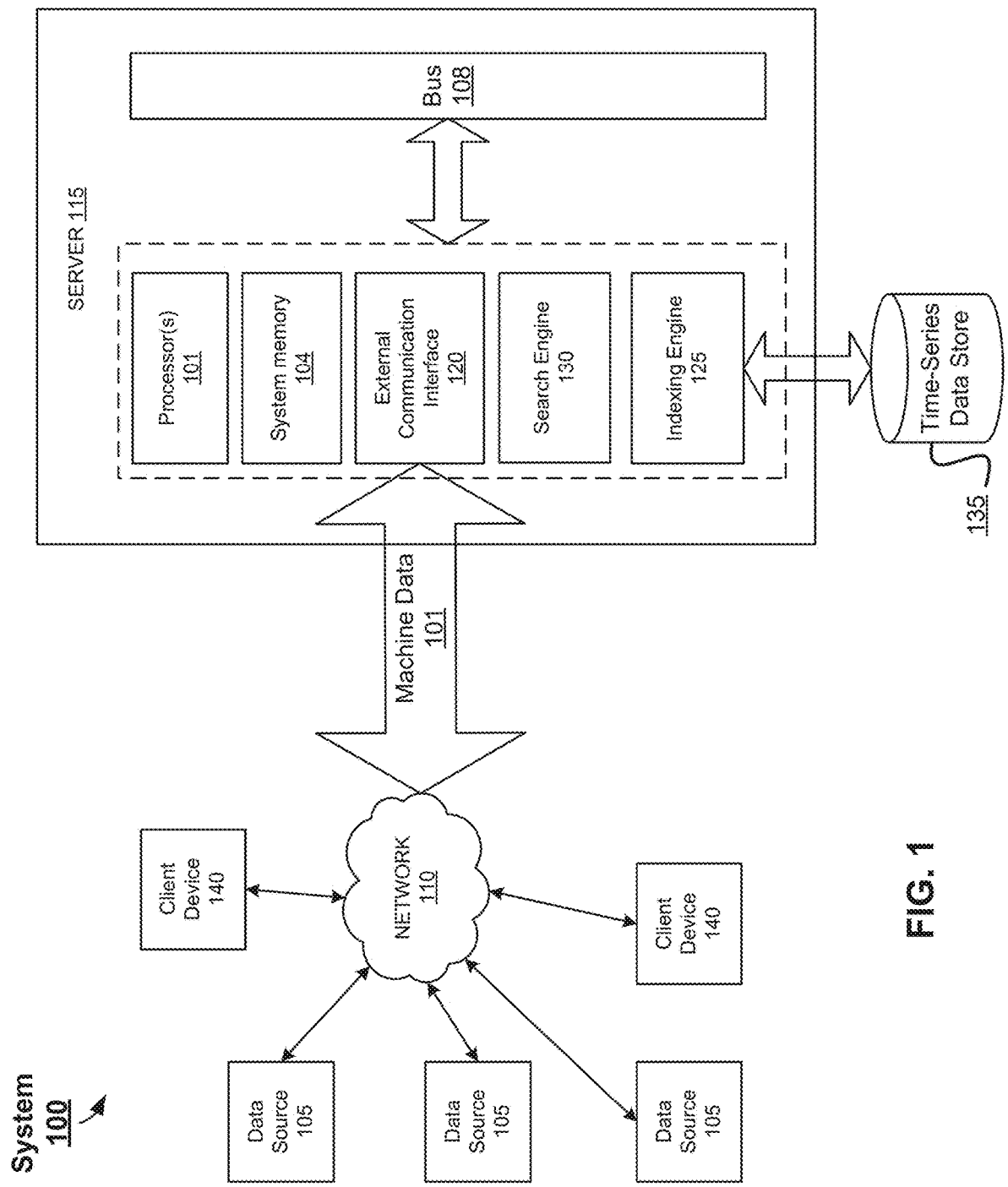
FIG. 1 depicts an example block diagram of a system for monitoring events in an information technology environment according to one embodiment.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

At least certain embodiments described herein relate to a graphical display of events matching one or more metrics on security data as well as trends in those events over a configurable time period. The graphical display can include a dashboard of metrics on things of interest in an environment. The graphical display allows selection from a list of pre-packaged or pre-defined security metrics and display a corresponding value for each selected metrics on a dashboard display. Selection can be made from a series of pre-packaged security metrics. Selection can also be made to report on those metrics that are important to a particular environment. The techniques described herein also allow for the creation and definition of metrics. The metrics can provide a trend analysis indicating whether the value of the given metric is increasing or decreasing over any configurable time period. Furthermore, embodiments allow a threshold value to be defined. An indication can then be provided from the system indicating if the value ought to be higher or lower than the defined threshold. For example, the graphic representing the value of the metric may change (e.g., change in color or graphical effects) if the metric is beyond a pre-defined threshold.

The graphical display can be embodied in a "dashboard" display. A dashboard can be thought of as a control panel in a graphical interface that provides at-a-glance views of system performance and other indicators relevant to a particular objective or process. Dashboards can give signals about an environment and can include summaries, key trends, comparisons, and exceptions, etc. In at least certain embodiments, the dashboard provides the ability to build their own display from pre-selected metrics and ordering them). The dashboard can display one or more metrics selected from a list of prepackaged metrics or pre-defined. In addition, a difference indicator or trend line can be displayed to indicate an increase or decrease in the metric over a configurable time period. For instance, a difference indicator or +5 can be displayed indicating an increase in the count of a certain number of events matching a selected metric in the last 24 hours or the last few days, etc., and can be configured to whatever relevant time period is required. A change in graphical representation (e.g., color change or other visual indicator) can also be displayed in the dashboard indicating whether the defined threshold(s) have been exceeded. Other embodiments provide the ability to drill down into the data set underlying the selected metrics as well as to provide the ability to select metrics that may be important so that they appear on the dashboard. Embodiments additionally allow re-ordering of the metrics in the dashboard as desired. In one embodiment, the environment includes a Security Information and Event Management ("SIEM")-type environment for computer or network security related information.

Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

FIG. 1 depicts an example block diagram of a system for monitoring events in an information technology environment according to one embodiment. In the illustrated embodiment, system 100 includes server 115 configured to communicate with a plurality of data sources 105 and a plurality of client devices 140 over network 110. Server 115 may also be implemented as a network of computer systems, a mainframe computer, networked computer, or any other data processing device. Network 110 is not limited to any particular network or network type and may include, for example, a local area network ("LAN"), a wide area network ("WAN"), or any type of wired or wireless networks, etc. In at least certain embodiments, server 115 is a high performance, scalable server configured to index and search machine data in real time. Server 115 is operable with data generated by any application, server, or data processing device and can be configured to access, process, and index streaming machine data and also handle search requests. In addition, server 115 can include an application server providing web interface adapted to search and navigate Information Technology ("IT") data and to manage deployment of applications through a browser interface. In FIG. 1, server 115 is shown to include one or more processors 101, a system memory such as a random access memory ("RAM") and read-only memory ("ROM"), an external communication interface 120, an indexing engine 125, and a search engine 130. External communication interface 120 can be configured to receive streams of machine data 101 from a plurality of different data sources 105 via network 110. Data sources 105 can include computers, routers, databases, operating systems, and applications. Each data source 105 generates one or more different types of machine data, such as server logs, activity logs, configuration files, remote files, network messages, database records, etc.

Machine data 101 can arrive synchronously or asynchronously from the plurality of sources 105. There may be many data sources 105 as well as large quantities of machine data 101 across multiple heterogeneous technologies and application domains. For example, a computer may be logging operating system events, a router may be auditing network traffic events, a database may be cataloging database reads and writes or schema changes, or an application may be sending the results of one application call to another across a message queue. Indexing engine 125 can be configured to receive the machine data 101 from the external communication interface 120 and separate it into "events" that can then be used to facilitate efficient keyword searching. In at least certain embodiments, an "event" indicates an occurrence of a condition within the IT environment that is being monitored by the server 115. Events can include data defined from unstructured, semi-structured, or structured machine data. Events can then be searched in real-time by search engine 130 or they can be indexed and stored in database 135 for use with non-real time searches. Search engine 130 may provide search and reporting capabilities.

Search engine 130 can be configured to receive a search query from client device 140. If the search query is a real-time search, the query can be used to retrieve events directly from indexing engine 125 without accessing the time-series database 135. Some real-time searches can be forward-looking searches for future events that have not yet occurred. For example, it may be desired to monitor the activity of an organization's IT infrastructure by having a continuously updated display of the top IP addresses that produce error messages in real time. Alternatively, if the search is a non-real-time search, the query may be used to obtain past events that are already stored in data store 135. Non-real-time searches, or historical searches, are backwards-looking searches for events that have already occurred. For example, it may be desired to locate the top IP addresses that produced error messages within the last three hours. Additionally, if the search is a hybrid real-time and non-real-time search query, events can be retrieved from both indexing engine 125 and data store 135. Hybrid search queries can be both forwards and backwards looking. An example is a search query for the top IP addresses that produced an error message in a time window that began 4 hours ago and continues into the future. At any time during either search process, search engine 130 can generate a report of the search results that can be output to a client device 140 for presentation.

In the illustrated embodiment, time-series data store 135 is coupled with indexing engine 125 in server 115. In other embodiments, data store 135 may be located within server 135 or may be remote server 115 through one or more networks (not shown). For example, data store 135 may be located at one of the client devices 140, in an external storage device coupled to server 115, or accessed via network 110. A time-series data store is capable of storing unstructured data from streams of machine data as semi-structured data indexed by time (i.e., time series data). A "data store" is a data repository of a set of integrated objects. These objects are modeled using classes defined in database schemas. Data store 135 can include not only data repositories like databases; it is a more general concept that includes also flat files that can store data. Some data stores do represent data in only one schema, while other data stores use several schemas for this task. Because of this functionality, a data store can be used to index, search, and analyze massive heterogeneous datasets. Such a data store can be optimized for time series data streams and can be configured to accept machine data in any format and allow for full text searches across multiple disparate data sources with no preconceived notions of schemas or relations, e.g., it is not a conventional relational database. This differs substantially from traditional relational databases. Indexing machine data is not practical in relational database management systems. Queries for historical data replete with time ranges and roll ups and arbitrary time zone conversions are difficult in a relational database.

Embodiments of the techniques described herein can be configured to apply a late-binding schema that can be improved over time by adding new fields or to go back and investigate the underlying data when something of concern or interest is discovered after the initial data ingestion process has completed. Late-binding schemas allow multiple schemas to be applied from different perspectives at any time and over any configurable time period. This differs from traditional database techniques that require binding at the time of data ingestion according to predefined fields in the database. Accordingly, embodiments are advantageous over prior database methods, and in particular relational database methods, because the fields can be updated at any time and the underlying data can be processed in new or different ways based on different fields or combination of fields. In addition, because the techniques described herein maintain all data in a time-series data store, the underlying data is always accessible for direct inspection or by using different search queries to identify new and interesting results. Traditional databases summarize and store the underlying data in the predetermined database fields at ingestion time, and the underlying data is thereafter discarded and unavailable for inspection or new search criteria.

Figure 2:
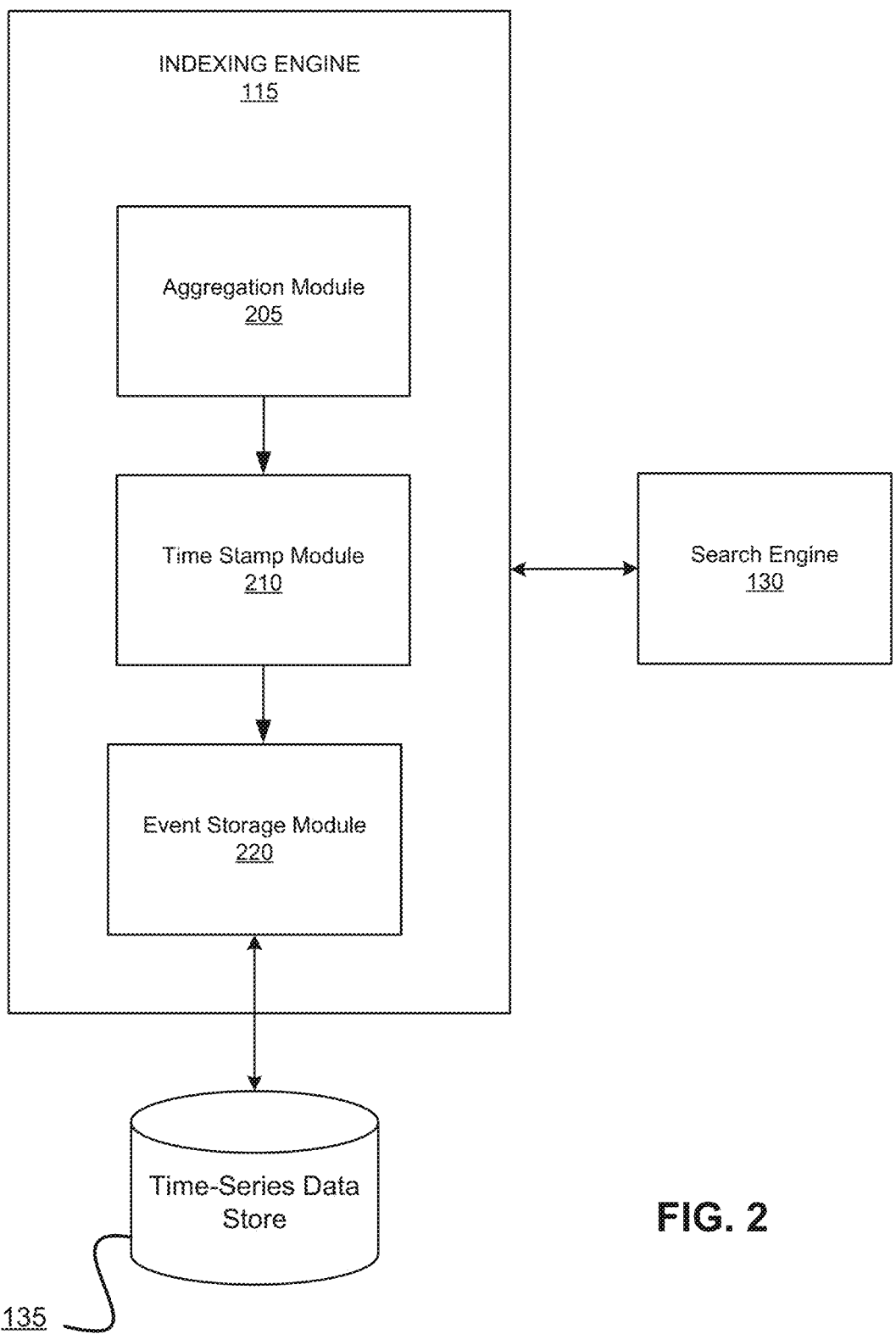
FIG. 2 depicts an example block diagram of an indexing engine according to one embodiment.

FIG. 2 depicts an example block diagram of an indexing engine according to one embodiment. In one embodiment, indexing engine 125 can be adapted to receive machine data from external communication interface 120 and break it into events. Indexing engine 125 also associates a time stamp with each event. The events can then be indexed and stored into time-series data store 135 based on time stamp and one or more extracted fields. Events can be searched in real-time in response to a query from search engine 130. As illustrated in FIG. 2, indexing engine may include aggregation module 204, time stamp module 210, event storage module 220, and real time search module 225. Aggregation module 205 is responsible for breaking the raw machine data 101 into individual events. Machine data 101 collected from web servers may have a single line per event, in which case each line of machine data 101 is a new event. Alternatively, machine data 101 may contain events that have a large number of lines, making identification of individual events within the data stream more difficult. In one embodiment, the aggregation module 205 uses feature extraction such as extracting leading punctuation, significant words, white space, or breaking characters to determine where the event boundaries are in the machine data.

Once incoming machine data 101 has been aggregated into individual events, the events and their event data can be input into a time stamp module 210. Time stamp module 210 determines whether the event data corresponds to one of a collection of known time stamp formats. If so, the event is considered to have a time stamp from a known format and the time stamp is extracted directly from the data. Otherwise, timestamp interpolation 505 is performed. If the domain is known for an event, the time stamp from the event data is extracted and passed with the event to the event storage module 220. In the case where an event did not contain a time stamp of a known format, then a timestamp can be assigned to the event based on its context. In one embodiment, the time stamp can be linearly interpolated from the time stamps of the immediately preceding and immediately following events from the same stream of machine data. If these events also contain no time stamps from a known domain, earlier or later events can be used for the interpolation process. In other embodiments, time stamps are interpolated based on the time associated with the entire stream of machine data. Once the events have been separated and time stamped, they can be passed to event storage module 220. Event storage module 220 is configured to identify a bucket for the events, index the events based on their associated time stamps and buckets, and store the events into time-series data store 135 where they can later be searched by search engine 130.

Figure 3:
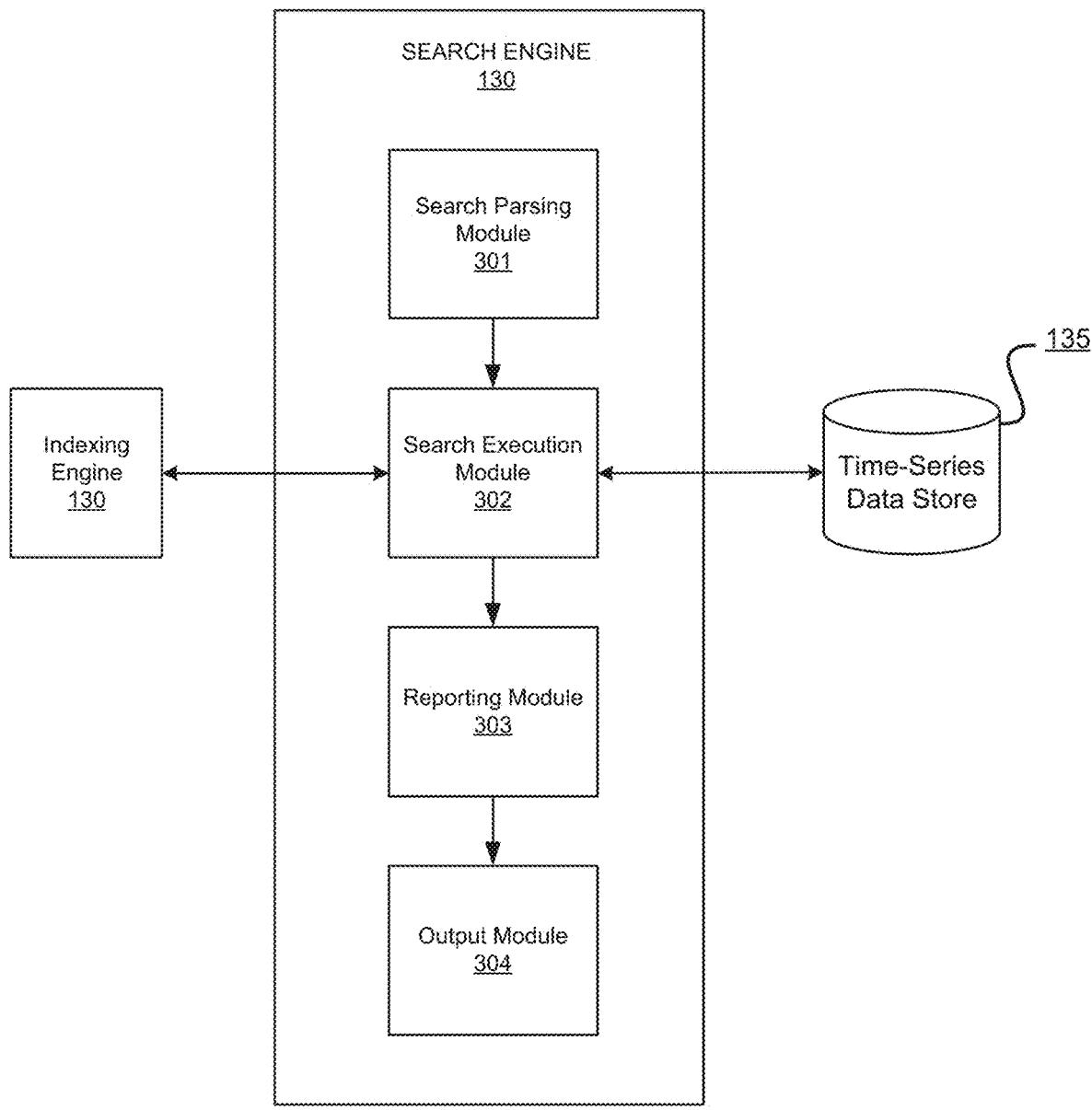
FIG. 3 depicts an example block diagram showing modules within a search engine according to one embodiment.

FIG. 3 depicts an example block diagram of modules within search engine 130 according to one embodiment. In operation, search engine 130 is configured to (1) receive search queries from a client device 140 over network 110, (2) parse the search query, (3) perform either a real-time search or non-real time (historical) search, and (4) generate a report of the search results. As illustrated, search engine 130 includes a search parsing module 301, search execution module 302, reporting module 303, and output module 304. Search parsing module 301 receives search queries 805 and parses them to determine where and how the search is to be run. Search execution module 302 communicates with indexing engine 125 to perform real-time searches and also communicates with data store 135 to perform historical searches. Search execution module 302 receives the parsed queries, determines the nature of them (e.g., real-time, historical, or hybrid), and runs the appropriate search to generate a set of search results. Reporting module 303 receives the set of results from search execution module 302 and then applies the main query portion of the search query to results and compiles the results into a report. Output module 304 formats reports generated by reporting module 303. Reports can be placed into a variety of formats suitable for transmission to client device 140, such as raw text, comma-separated-values (CSV), javascript object notation (JSON), extensible markup language (XML), portable document format (PDF), etc. In one embodiment, the report is presented in a graphical format, such as in a bar, pie, or line graph. The formatted reports are then output to client devices 140 where they are displayed or stored to disk. Alternatively, the formatted results are output to storage within server 115 or output to a display coupled with server 115.

Figure 4A:
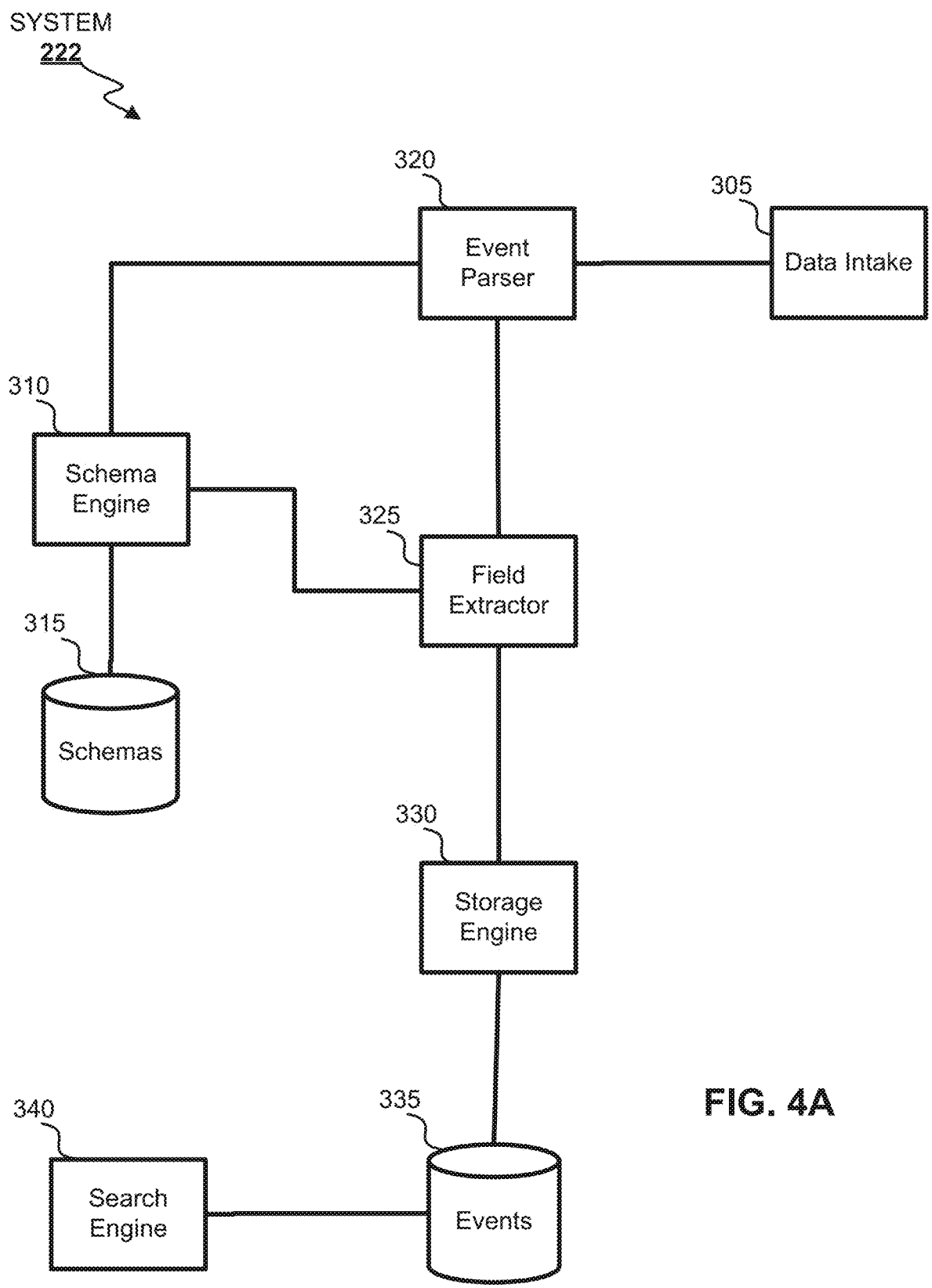
FIG. 4A depicts an example block diagram of a data management system according to one embodiment.

FIG. 4A depicts an example block diagram of a data management system according to one embodiment. In the illustrated embodiment, system 222 includes a data intake 305 module adapted to receive machine data, e.g., from a data provider, client, or user. The data can include automatically collected data, uploaded data, or data provided by the data provider directly. In some instances, the data includes a structure that allows for individual events and field values within the events to be easily identified. The structure can be predefined or identified within the data. For example, various strings or characters can separate and identify fields. As another example, field values can be arranged within a multi-dimensional structure, such as a table. The data may be partly or completely lacking in explicit structure. For example, in some instances, no structure for the data is present when the data is received and instead is generated later. The data may include a continuous data stream can include multiple events, each with multiple field values.

System 222 further includes a schema engine 310 can be configured to identify an applicable schema that can be used to extract specific field values by imposing structure on data. Specifically, a schema can be "bound" to data, by breaking a data stream (e.g., a byte stream) into events and extracting field values such as a time stamp. This is referred to as schema binding and can occur at any time in the process including while receiving data, prior to storing data, while storing data, while processing data, while retrieving data, while responding to a search query or some combination of the above (e.g., separating data into events at intake and extracting field values from events while responding to a search query). A late-binding schema can also be used which imposes structure on the data at query time rather than at the time the data is ingested or stored.

Schema engine 310 can itself estimate a schema or can determine a schema based on input from a client or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data or headers or tags identifying various fields in the data, such as <event> <message time>2014.01.05.06.59.59</> . . . </>). Schema can be received or estimated in a variety times, including (in some instances) any time between receipt or indexing of the data and a query time. The time that the schema is actually received or estimated within the receipt-to-indexing time period may be determined based on a setting or system load. Schema engine 410 can also perform the schema estimation once or multiple times (e.g., continuously or at routine intervals). Once a schema is determined, it can be modified periodically, at regular times or intervals, upon receiving modification-requesting input, upon detecting a new or changed pattern in the input, or upon detecting suspicious extracted field values (e.g., an inconsistent data type such as strings instead of previously extracted integers). In some instances, a client or data provider can provide input indicating a satisfaction with or correction to estimated schema. Received or estimated schemas can be stored in a schema data store 415.

Using a schema, an event parser 320 can separate the received data into events. For example, event parser 320 can separate data between particular start and stop tags, separate data within a table's row, or separate data within particular character numbers in the data. Also using the schema, a field extractor 325 can extract various field values. In some instances, field extractor 325 further attaches a semantic meaning to the extracted field values (e.g., based on a length or character types of the field values). Field extractor 325 can further convert field values into a particular (e.g., standard or easily searchable) format.

It is noted that data collector 205 from system 200 can largely parallel the combination of data intake 305 and event parser 320. While system 222 does not explicitly show schema engine 310 and schema data store 315, it will be appreciated that system 222 can include these elements, which can then be utilized by a data collector 305 and field extractor 325.

A storage engine 330 can store data in an event data store 335. It will be appreciated that event data store 335 can include multiple data stores or sub-data stores. Event data store 335 can be stored in working, short-term or long-term memory. In various instances, event data store 335 can include raw data, extracted events and extracted field values. In other instances, part of the data received by data intake 305 can be deleted or not stored (e.g., field breaks).

Events and field values can be stored at locations based on a field value. For example, a field value identifying a message sender may be stored in one of ten data stores, the data store being chosen based on a message time. In some instances, rather than grouping various data components at specific storage areas, event data store 335 can include an index that tracks identifiers of events and/or fields and identifiers of field values. Thus, for example, the index can include an element for "Data type='webpage request'" (indicating that the element refers to a field value of "webpage request" for the field "data type"), and then list identifiers for events with the field value (e.g., "Events 3, 7, 9 and 16"). Selective storage grouping can be referred to as storing data in "buckets." Bucket definitions can be fixed or defined based on input from a data provider or client. In addition, automatic rules or inputs can be used to add, merge or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 340 can subsequently access and search all or part of event data store 335. The search can be performed upon receiving a search query from a client, the search can be performed periodically and/or at defined intervals or times. Segregation of data into events and/or fields can allow for more efficient searching. The search may include, e.g., a request to return all events or identifiers of all events having a value for a field meeting a criterion. To illustrate, search engine 340 can retrieve all events having a timestamp within a defined time period, or all events having a first field value (e.g., HTTP method) set to a specified value (e.g., GET).

The search may include, e.g., a request to return values for one or more first fields for all events having specified values (e.g., specific values or values within a specific range) for one or more second fields. To illustrate, search engine 340 can retrieve all URLs in events having a timestamp within a defined time period, or all events having a first field value (e.g., HTTP method) set to a specified value (e.g., GET). In some instances, upon retrieving the event data of interest, search engine 340 may further process the results. The processing may be performed based on an individual value (e.g., to obtain a length or determine if an extracted field value matches a specified value). In some instances, processing can be performed across values, e.g., to determine an average, frequency, count or other statistic. Search engine 340 can return the search result to a data provider, client or user, e.g., via an interface (such as a web interface or app interface) or email.

Figure 4B:
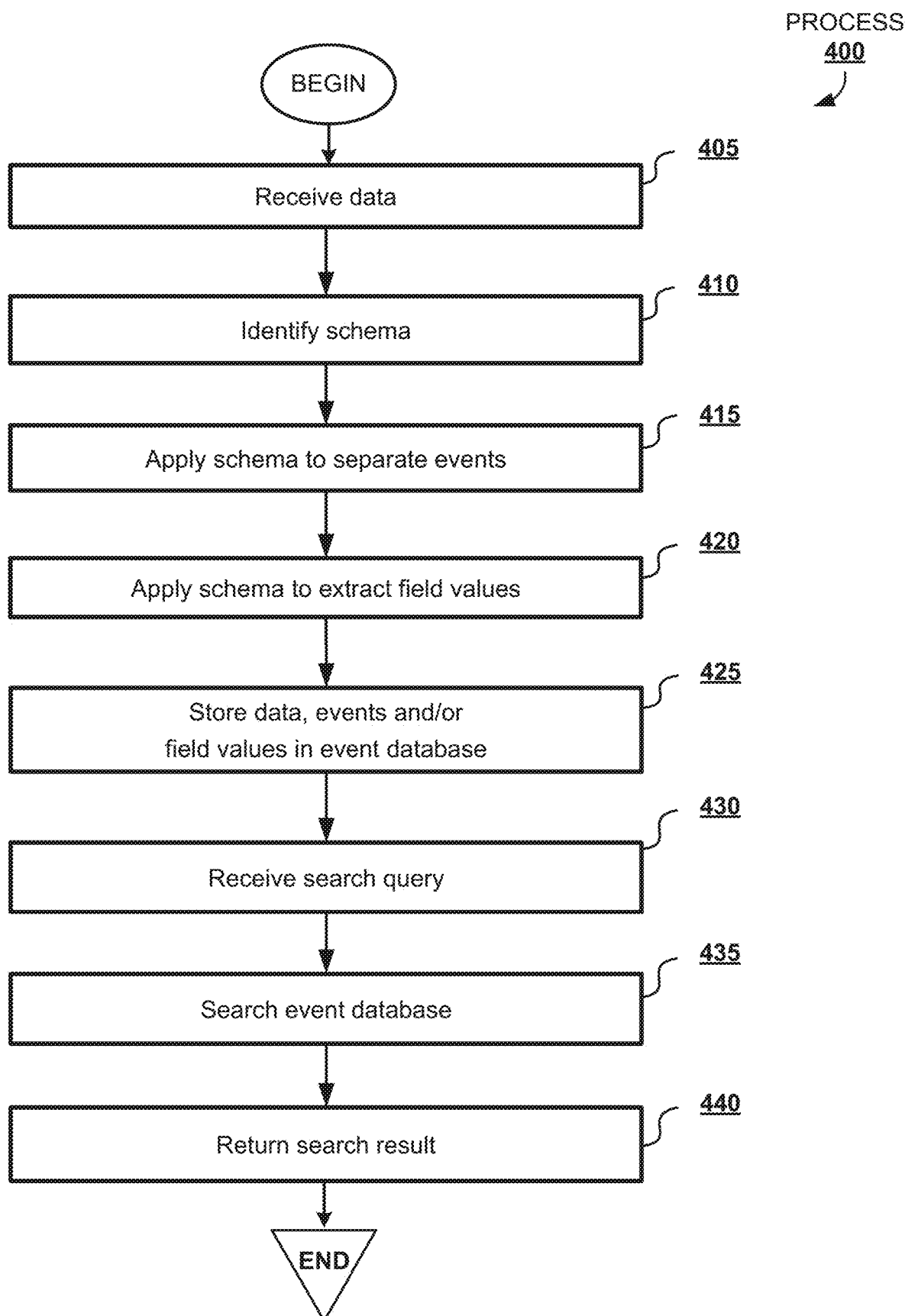
FIG. 4B depicts an example flowchart of process for storing and using big data according to one embodiment.

FIG. 4B depicts an example flowchart of a process 400 for storing and using big data according to one embodiment. Process 400 begins at operation 405, where data intake 305 receives data. Schema engine 310 identifies an applicable schema at operation 410. Event parser 320 applies the schema to separate the data into events at operation 415. Field extractor 325 applies the schema to extract field values from the events at operation 420. Storage engine 330 stores raw data, events and/or field values in event data store 335 (e.g., by assigning the data, events and/or field values to buckets based on particular field values) at operation 425.

Search engine 340 receives a search query from a searcher (e.g., client or user) at operation 430. The search query can include one or more criteria which can specify or constrain field values. Search engine 340 searches event data store 335 at operation 435. The search can entail searching only some of event data store 335 (e.g., that include field values of interest). The search can produce identifiers of events of interest. Search engine 340 may then collect other field values for those events of interest. A search result can include the collected other field values and/or a processed version thereof. Search engine 340 returns the search result to the searcher at operation 340.

It will be appreciated that system 222 and/or process 400 can be modified such that schema is not bound to data (or only a portion of the schema is bound to data) immediately following intake. For example, schema could instead be bound prior to or during storage of the data or at a query time (e.g., subsequent to operation 430 of process 400). Data management system 222 and/or process 400 can be modified to include features, feature connections or flows as described in Carasso, David, *Exploring Splunk Search Processing Language (SPL) Primer and Cookbook*, New York: CITO Research, 2012, or as described in Ledion Bitincka, Archana Ganapathi, Stephen Sorkin, and Steve Zhang, *Optimizing data analysis with a semi-structured time series database*, In SLAML, 2010. Each of these references is hereby incorporated by reference in its entirety for all purposes.

Figure 5A:
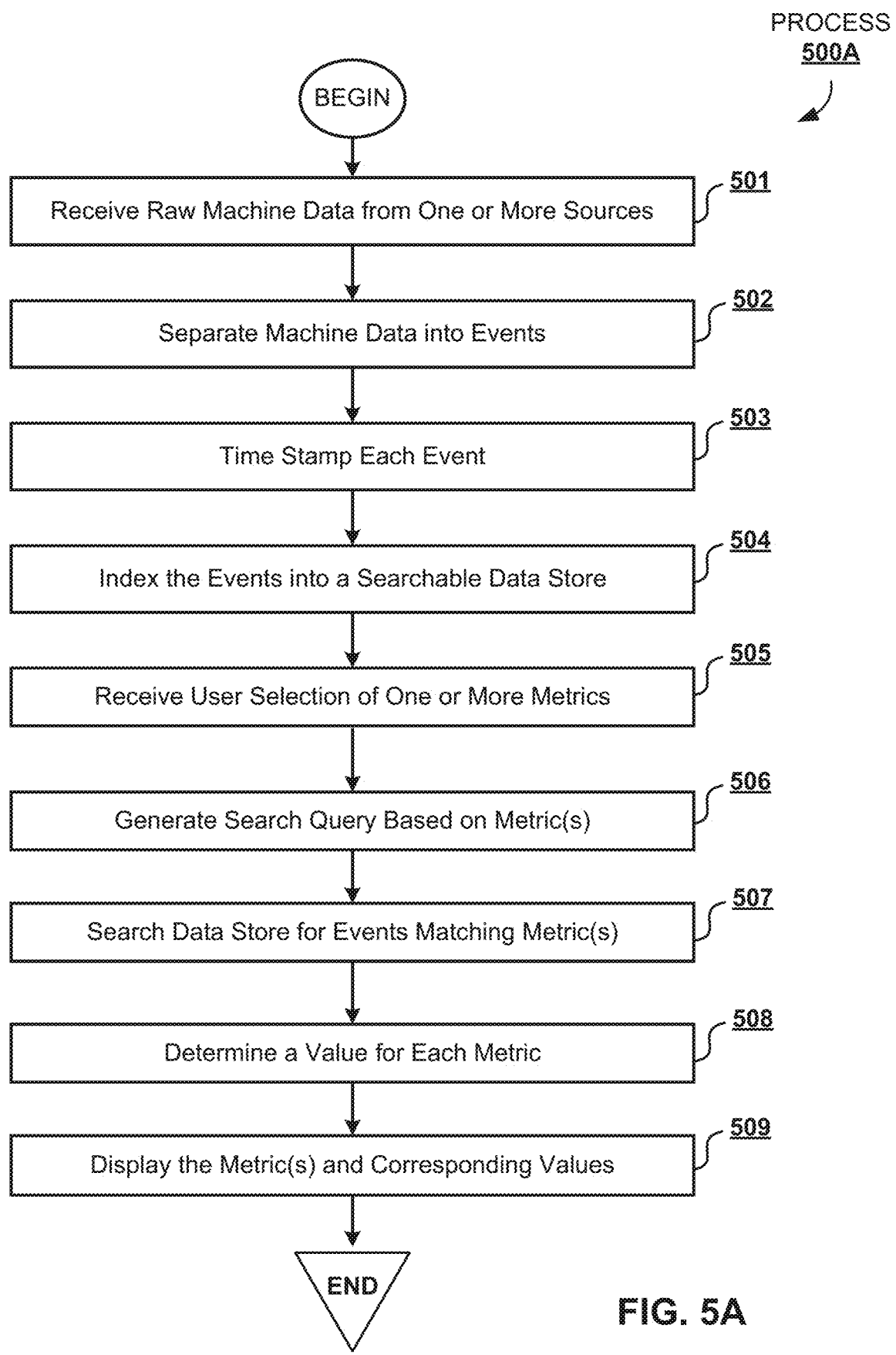
FIG. 5A depicts an example flowchart of a process for monitoring events in an information technology environment according to one embodiment.

FIG. 5A depicts an example flowchart of a process for monitoring events in an information technology environment. In the illustrated embodiment, process 500A begins at operation 501 where the raw machine data is received at the monitoring system from one or more of multiple different sources. In other embodiments, the raw machine data could be received from a single source, or multiple different types of machine data could be received from a single or multiple sources. The raw machine data is then separated into one or more events (operation 502) which are each time stamped (operation 503) and indexed into a searchable data store (operation 504). An applicable schema can be identified and applied to separate the data into events as described above. The schema can also be applied to extract field values from the events. The events can then be separated and stored in the data store (e.g., by assigning the data, events and/or field values to buckets based on particular field values). In the preferred embodiment, the searchable data store is a time-series data store as described above.

The system can then be configured to receive a selection of a metric corresponding to one or more conditions in the environment (operation 505). As used herein, a "metric" can be any measure for quantitatively assessing, controlling, or selecting a process or event. For instance, in the Enterprise Security context, a metric can be any or all of the following: (1) average of age of infections; (2) how long an infection has been present; (3) number of unique or new forms of malware; (4) number of current infections of new malware; (5) number of vulnerabilities; (6) number of vulnerable hosts (e.g., hosts with vulnerabilities of medium or higher severity); (7) average number of vulnerabilities per host (indicates how vulnerable hosts are); (8) percentage of hosts vulnerable (hosts with vulnerabilities of medium or higher severity); number of notable events; (10) number of default accounts active; (11) number of account lockouts; (12) percentage of hosts infected; (13) sensor uptime; (14) number of hosts not time synching; (15) number of systems not being patched; (16) number of systems with old anti-virus definitions; (17) number of systems having anti-virus protection; or (18) percentage of systems having anti-virus protection. Other metrics are possible within the ES space. The techniques described herein are not limited to any particular metrics or environment.

Metrics are usually particular to a subject area, in which case they are valid only within a certain domain and cannot be directly benchmarked or interpreted outside it. The techniques described herein are not limited to any particular environment. In addition, in at least certain embodiments, the metrics can be configurable from a list or menu of predetermined metrics. The list of predefined metrics can be provided to choose from, and selection can be made of the ones for display, which may be the most common or most important ones. The order of the metrics displayed can be specified as well as define one or more thresholds for the metrics. Alternatively, the metrics can be user-definable.

Process 500A continues at operation 506 where the system generates a search query based on one or more of the selected metrics in order to search the data store for events matching the selected metric (operation 507). The search query can include one or more criteria which can specify or constrain field values. The search can entail searching only some of event data (e.g., including field values of interest). A value can then be determined for each metric based on the results of the search (operation 508). In one embodiment, the value is determined over a configurable time period. The value corresponding to each metric may be a simple count of the number of events that match a particular metric, or it may be some statistical calculation on events matching a particular metric or the number of times some combination of criteria is met. Since the time-series data store is configured to store time-based data, every event can be monitored and processed over any configurable time period desired. Process 500A concludes at operation 509 when the system displays the metric(s) and corresponding values in a graphical interface.

Embodiments described herein enable selection from a list of metrics within an environment and display a corresponding value in a graphical interface in response thereto. In one embodiment, the display in the graphical interface is a dashboard display. As discussed above, dashboards can give signals about an environment and can include summaries, key trends, comparisons, and exceptions, etc. This allows selection from a series of pre-packaged or predetermined metrics and to choose to report on those that are important to them. The system also allows creation of customized metrics. The metrics can also provide a trend analysis indicating whether the value of the given metric is increasing or decreasing. Furthermore, the system allows a threshold to be defined for each metric and whether the value corresponding to the defined metric ought to be higher or lower than the threshold. In one embodiment, the graphic representing the value of the metric may change (e.g., change color or graphical effect) if the events corresponding to the metric exceed the threshold. This completes process 400 according to one illustrative embodiment.

Figure 5B:
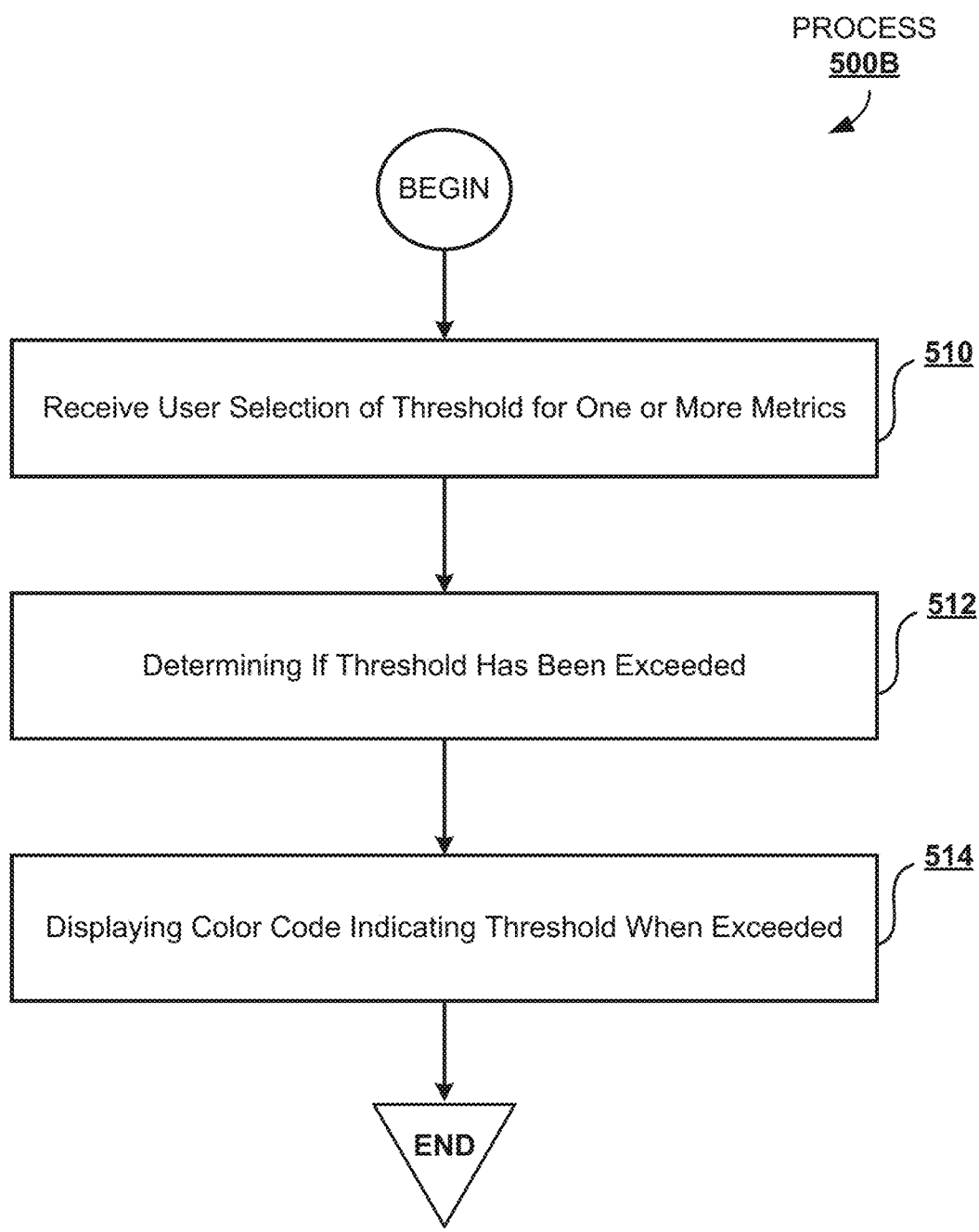
FIG. 5B depicts an example flowchart of a process for monitoring events in an information technology environment according to one embodiment.

FIG. 5B depicts an example flowchart of a process for monitoring events in an information technology environment according to a further embodiment. As shown, process 500B begins at operation 510 where a selection is received of a configurable threshold for the value corresponding to the one or more metrics. An indication is then displayed indicating whether the value exceeds the configurable threshold (operation 512). Further, a graphic such as a color code may be displayed along with the categories of events indicating when the threshold has been exceeded (operation 514). Multiple thresholds may be set including high and low thresholds for particular environments. In addition, an updated configurable threshold may be selected for changes in the value over a configurable time period.

The system can then provide an indication in the graphical interface indicating whether the change in value exceeds the second threshold. A graphic such as a color code may also be displayed indicating when the second configurable threshold has been exceeded. For example, a green color code could be displayed to indicate a configurable threshold has not been exceeded or red color code indicating the threshold has been exceeded. Other embodiments can provide other visual cues to indicate when the configurable thresholds have been exceeded. For example, a "+5" could be displayed indicating an increase in the number of events matching a particular metric in the last 24 hours.

It should be appreciated that the specific operations illustrated in FIGS. 4B-5B depict a particular embodiment of a process for monitoring events in an IT environment. Other sequences of operations may also be performed in alternative embodiments. For example, alternative embodiments may perform the operations outlined above in a different order. Moreover, the individual operations may include multiple sub-steps that may be performed in various sequences as appropriate and additional operations may be added or removed depending on the particular applications. One of ordinary skill in the art would recognize the many possible variations, modifications, and alternatives.

FIG. 6A depicts an example of a listing of correlation searches in a graphical display according to one embodiment. Correlation searches are used to determine which events match a selected metric. Correlation searches are listed in the graphical display based on matching the selected metric(s) with events stored in the time-series data store. Graphical display 601 includes a listing of correlation searches by name such as correlation search 605. Each of these searches in the list can include additional information such as what particular metric is associated with the correlation search and whether the search was a real-time or historical search. If one of the searches in the list is selected, a drill down can be performed and information relating to that particular search can be displayed in a drill-down view of the machine data underlying each event (see, e.g., FIG. 6C). Moreover, statistical data of the events that match the selected metric can also be displayed as well as a drill down view of the events underlying the statistical data can be displayed upon selection of the event with an input device.

Figure 6B:
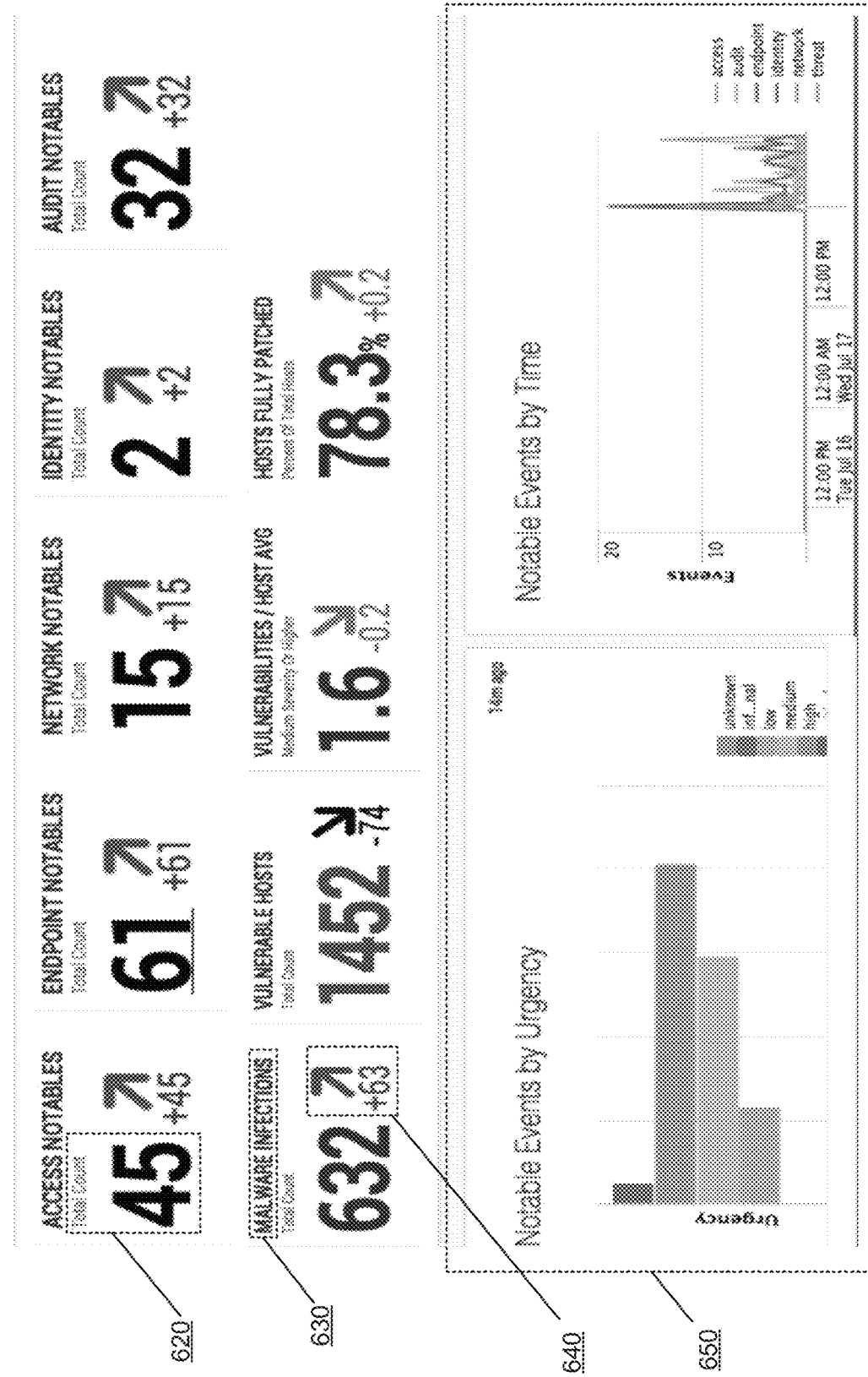
FIG. 6B depicts an example graphical display of metrics and corresponding values according to one embodiment.

FIG. 6B depicts an example graphical display of metrics and corresponding values according to one embodiment. The illustrated embodiment is one example of a graphical display of events matching one or more metrics on a set of machine data as well as trends in those events over a configurable time period. In this case, the events are security related events relating to security monitoring in a computer or network environment. The embodiments described herein, however, are not limited to any particular environment or machine data. The graphical display 602 includes a dashboard of metrics on things of interest in an environment including the various metrics 630 and the accompanying value(s) 620. For instance, as shown malware infections is a metric 630 and its associated value 620 is equal to "632," which represents the total number of malware infections in the environment during the selected time period. The various metrics displayed can be selected from a list of pre-packaged or pre-defined security metrics and displayed along with a corresponding value for each of the selected metrics. Selection can be made from a series of pre-packaged security metrics to report on those metrics that are important to a particular environment. The techniques described herein also allow for the creation and definition of metrics. The metrics can provide a trend analysis indicating whether the value of the given metric is increasing or decreasing over any configurable time period.

Furthermore, embodiments allow a threshold value to be defined. An indication can then be provided from the system indicating if the value ought to be higher or lower than the defined threshold. For example, the graphic representing the value of the metric may change (e.g., change in color or graphical effects) if the metric is beyond a pre-defined threshold. Information 640 relating to the configurable threshold is displayed. In the illustrated embodiment, a color code 640 as well as a numerical value 620 and a difference indicator 640 are displayed, in this case +63 with an up arrow, signaling that the threshold has been exceeded for this particular metric. Other values are possible depending on the metric and are not limited to a numerical count. As shown, the values associated with the metrics can include a statistical percentage or even the level of severity of a particular metric. Other types of values are possible and the embodiments described herein are not limited to any particular type of value. Graphical display 602 includes other graphics and information 650 as selected for display. The difference indicator 640 is displayed to indicate an increase or decrease in the metric over a configurable time period. For instance, the difference indicator can represent a change in the number of events matching the selected metric in the last 24 hours or the last few days, etc., and can be configured to whatever relevant time period is required.

Figure 6C:
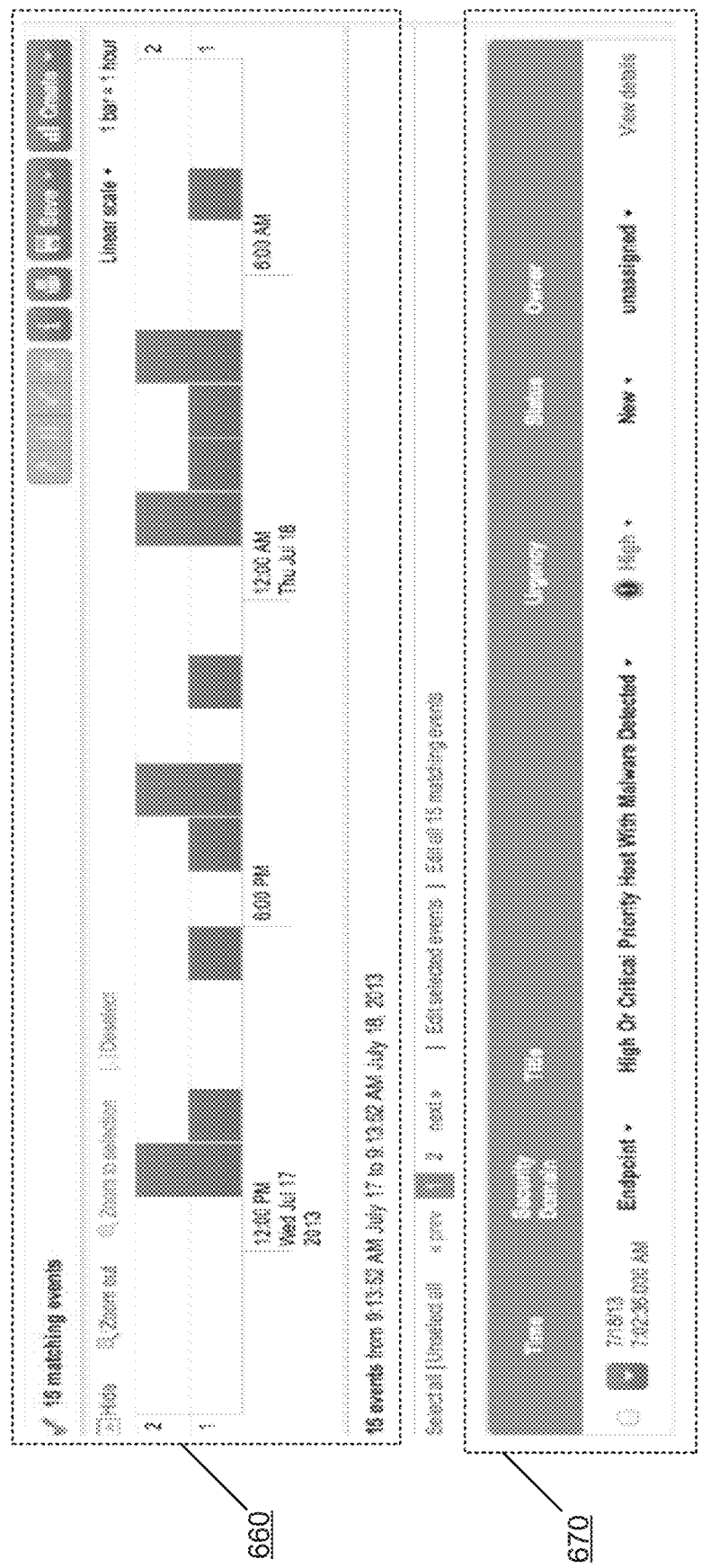
FIG. 6C depicts an example graphical display of a search result for a metric over a configurable time period according to one embodiment.

Other embodiments provide the ability to drill down into the data set underlying the selected metrics as well as to provide the ability to select metrics that may be important so that they appear on the dashboard. Embodiments additionally allow re-ordering of the metrics in the dashboard as desired. FIG. 6C depicts an example graphical display of a search result for a metric over a configurable time period according to one embodiment. In this embodiment, a drill down view is provided displaying one of the metrics is selected from the display of FIG. 6B with an input device, for example. Graphical display 603 shows a list of events 670 matching the "High or Critical Priority Host With Malware Detected" metric. A breakdown of the detailed information 660 relating to these events is also shown in a bar chart for a time period selected. The drill-down view of graphical display 603 includes detailed information about events matching the selected "High or Critical Priority Host With Malware Detected" metric over the selected time period including the frequency of events and the time the events were determined by the system. The listing of events 670 provides additional information for the events matching the metric. In this case, the detailed information includes the time, the domain of the selected metric, the identifier (e.g., name) and/or brief description of the metric, the urgency of the event, whether the event is new or ongoing, and the administrator assigned to respond to the event. Other information is possible.

Figure 7:
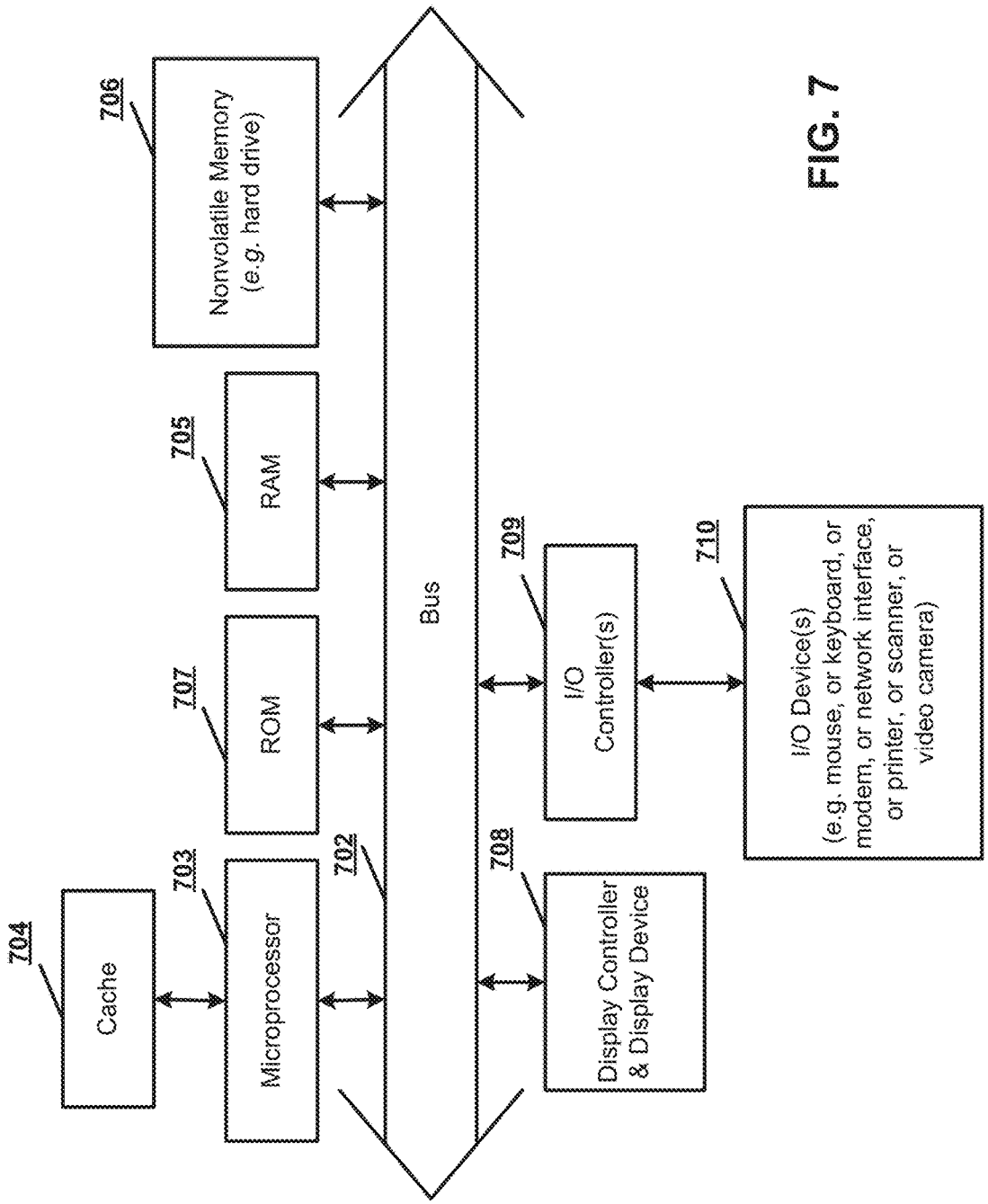
FIG. 7 depicts an example block diagram of a data processing system upon which the disclosed embodiments may be implemented.

FIG. 7 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network.

FIG. 7 shows one example of a data processing system, such as data processing system 700, which may be used with the present described embodiments. Note that while FIG. 7 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 7 may, for example, a personal computer (PC), workstation, tablet, smartphone or other hand-held wireless device, or any device having similar functionality.

As shown, the data processing system 701 includes a system bus 702 which is coupled to a microprocessor 703, a Read-Only Memory (ROM) 707, a volatile Random Access Memory (RAM) 705, as well as other nonvolatile memory 706. In the illustrated embodiment, microprocessor 703 is coupled to cache memory 704. System bus 702 can be adapted to interconnect these various components together and also interconnect components 703, 707, 705, and 706 to a display controller and display device 708, and to peripheral devices such as input/output ("I/O") devices 710. Types of I/O devices can include keyboards, modems, network interfaces, printers, scanners, video cameras, or other devices well known in the art. Typically, I/O devices 710 are coupled to the system bus 702 through I/O controllers 709. In one embodiment the I/O controller 709 includes a Universal Serial Bus ("USB") adapter for controlling USB peripherals or other type of bus adapter.

RAM 705 can be implemented as dynamic RAM ("DRAM") which requires power continually in order to refresh or maintain the data in the memory. The other nonvolatile memory 706 can be a magnetic hard drive, magnetic optical drive, optical drive, DVD RAM, or other type of memory system that maintains data after power is removed from the system. While FIG. 7 shows that nonvolatile memory 706 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable storage medium embodied in computer hardware or a computer program product. Computer-readable media can be adapted to store computer program code, which when executed by a computer or other data processing system, such as data processing system 700, is adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A computer-implemented method comprising:
   receiving a selection of a metric from a set of selectable metrics;

in response to the selection:
generating a search query based on the metric, the search query including a criterion for a field value,
identifying events of interest from a set of machine data containing a plurality of events, by identifying instances in which the field value in events in the set of machine data matches the criterion in the search query, wherein the machine data includes security data or data indicative of performance of at least one component in an information technology environment, and
calculating a first value for the metric from the identified events of interest, the first value corresponding to a number of events associated with the metric at a first time of a configurable time period;
calculating a second value for the metric, the second value corresponding to a number of events associated with the metric at a second time of the configurable time period;
determining a change value based on a difference between the second value and the first value;
determining a relationship between the second value and a first threshold; and
determining a relationship between the change value and a second threshold;
updating the value of the metric continuously in real time as additional machine data is received; and
causing display, in a dashboard, of updated values of the metric as time progresses and trend information related to changes in a numerical value of the metric, the display including an identifier of the metric, an indication of the second value, an indication of the change value, a first color indicator of the relationship between the second value and the first threshold, and a second color indicator of the relationship between the change value and the second threshold.

2. The computer-implemented method of claim 1, further comprising:
receiving selection of the first threshold as a configurable threshold to be applied to the second value; and
causing display of an indicator indicating that the second value of the metric exceeds the configurable threshold.

3. The computer-implemented method of claim 1, further comprising:
receiving selection of the second threshold as a configurable threshold to be applied to the change value; and
causing display of an indicator indicating that the change value exceeds the configurable threshold.

4. The computer-implemented method of claim 1, further comprising:
causing display of a drill down view of the machine data underlying at least one of the first value or the second value of the metric upon selection of the metric.

5. The computer-implemented method of claim 1, wherein the second value is determined based upon a number of events identified as search query results.

6. The computer-implemented method of claim 1, further comprising:
receiving selection of a time period for the metric, wherein the identified events of interest fall within the configurable time period.

7. The computer-implemented method of claim 1, further comprising:
causing display of a list of searches for events of interest, wherein each search in the list includes:
a name of the search, and
a type of the search.

8. The computer-implemented method of claim 7, further comprising:
causing display of a drill down view of a machine data underlying the event of interest associated with the search upon selection of the search.

9. The computer-implemented method of claim 7, wherein the list further includes a domain within which the event of interest is identified.

10. The computer-implemented method of claim 7, wherein the list further includes a status field that includes a first selectable option that enables a search for the event of interest and a second selectable option that disables the search for the event of interest.

11. The computer-implemented method of claim 7, wherein the type of search includes any one of a scheduled search and a real-time search.

12. The computer-implemented method of claim 7, wherein for each event of interest for which a scheduled search is performed, causing display of a date and time when a next search is scheduled to be performed to identify a presence of an event of interest.

13. The computer-implemented method of claim 1, wherein the metric from the plurality of metrics is related to operational performance in the information technology environment.

14. The computer-implemented method of claim 1, wherein the machine data include unstructured or semi-structured data.

15. The computer-implemented method of claim 1, wherein the machine data is log data.

16. An apparatus comprising a processor and a memory coupled to the processor, the memory having instructions stored therein, execution of which by the processor causes the apparatus to:
receive a selection of a metric from a set of selectable metrics;
in response to the selection:
generate a search query based on the metric, the search query including a criterion for a field value,
identify events of interest from a set of machine data containing a plurality of events, by identifying instances in which the field value in events in the set of machine data matches the criterion in the search query, wherein the machine data includes security data or data indicative of performance of at least one component in an information technology environment, and
calculate a first value for the metric from the identified events of interest, the first value corresponding to a number of events associated with the metric at a first time of a configurable time period;
calculate a second value for the metric, the second value corresponding to a number of events associated with the metric at a second time of the configurable time period;
determine a change value based on a difference between the second value and the first value;
determining a relationship between the second value and a first threshold; and
determine a relationship between the change value and a second threshold;
update the value of the metric continuously in real time as additional machine data is received; and
cause display, in a dashboard, of updated values of the metric as time progresses and trend information related to changes in a numerical value of the metric, the display including an identifier of the metric, an indication of the second value, an indication of the change value, a first color indicator of the relationship between the second value and the first threshold, and a second color indicator of the relationship between the change value and the second threshold.

17. The apparatus of claim 16, wherein the processor is further configured to:
receive selection of the first threshold as a configurable threshold to be applied to the second value; and
cause display of an indicator indicating that the second value of the metric exceeds the configurable threshold.

18. The apparatus of claim 16, wherein the processor is further configured to:
receive selection of the second threshold as a configurable threshold to be applied to the change value; and
cause display of an indicator indicating that the change value exceeds the configurable threshold.

19. A non-transitory computer readable program storage medium having code stored therein, execution of which by a processor in a computer system causes the computer system to perform a method comprising:
receiving a selection of a metric from a set of selectable metrics;
in response to the selection:
generating a search query based on the metric, the search query including a criterion for a field value,
identifying events of interest from a set of machine data containing a plurality of events, by identifying instances in which the field value in events in the set of machine data matches the criterion in the search query, wherein the machine data includes security data or data indicative of performance of at least one component in an information technology environment, and
calculating a first value for the metric from the identified events of interest, the first value corresponding to a number of events associated with the metric at a first time of a configurable time period;
calculating a second value for the metric, the second value corresponding to a number of events associated with the metric at a second time of the configurable time period;
determining a change value based on a difference between the second value and the first value;
determining a relationship between the second value and a first threshold; and
determining a relationship between the change value and a second threshold;
updating the value of the metric continuously in real time as additional machine data is received; and
causing display, in a dashboard, of updated values of the metric as time progresses and trend information related to changes in a numerical value of the metric, the display including an identifier of the metric, an indication of the second value, an indication of the change value, a first color indicator of the relationship between the second value and the first threshold, and a second color indicator of the relationship between the change value and the second threshold.

20. The non-transitory computer readable program storage medium of claim 19, wherein the method further comprises:
receiving selection of the first value as a configurable threshold to be applied to the second value; and
causing display of an indicator indicating that the second value exceeds the configurable threshold.

21. The computer-implemented method of claim 1, further comprising:
separating the set of machine data into two or more events by identifying a presence of a feature in the set of machine data,
wherein the feature identifies a boundary used to separate the set of machine data into the two or more events, and
wherein the two or more events comprise the events of interest.

22. The computer-implemented method of claim 21, wherein the feature includes a leading punctuation, a word, a white space, or a breaking character.

23. The apparatus of claim 16, wherein the processor is further configured to:
separate the set of machine data into two or more events by identifying a presence of a feature in the set of machine data,
wherein the feature identifies a boundary used to separate the set of machine data into the two or more events, and
wherein the two or more events comprise the events of interest.

24. The apparatus of claim 23, wherein the feature includes a leading punctuation, a word, a white space, or a breaking character.

25. The non-transitory computer readable program storage medium of claim 19, wherein the method further comprises:
separating the set of machine data into two or more events by identifying a presence of a feature in the set of machine data,
wherein the feature identifies a boundary used to separate the set of machine data into the two or more events, and
wherein the two or more events comprise the events of interest.

26. The non-transitory computer readable program storage medium of claim 25, wherein the feature includes a leading punctuation, a word, a white space, or a breaking character.

* * * * *